(12) United States Patent
Asano

(10) Patent No.: US 10,943,457 B2
(45) Date of Patent: *Mar. 9, 2021

(54) CONTENT REPRODUCTION APPARATUS, MOBILE APPLIANCE, AND ABNORMALITY DETECTION METHOD

(71) Applicant: Sony Corporation, Tokyo (JP)

(72) Inventor: Yasuharu Asano, Kanagawa (JP)

(73) Assignee: Sony Corporation, Tokyo (JP)

( * ) Notice: Subject to any disclaimer, the term of this patent is extended or adjusted under 35 U.S.C. 154(b) by 12 days.

This patent is subject to a terminal disclaimer.

(21) Appl. No.: 15/633,817

(22) Filed: Jun. 27, 2017

(65) Prior Publication Data

US 2017/0294095 A1 Oct. 12, 2017

Related U.S. Application Data

(63) Continuation of application No. 13/023,741, filed on Feb. 9, 2011, now Pat. No. 9,773,394.

(30) Foreign Application Priority Data

Feb. 15, 2010 (JP) .............................. JP2010-030368

(51) Int. Cl.
| | | |
|---|---|---|
| *G08B 21/04* | (2006.01) | |
| *G08B 21/18* | (2006.01) | |
| *G08B 29/18* | (2006.01) | |
| *H04N 21/258* | (2011.01) | |

(52) U.S. Cl.
CPC ..... *G08B 21/0423* (2013.01); *G08B 21/0469* (2013.01); *G08B 21/0484* (2013.01); *G08B 21/182* (2013.01); *G08B 29/185* (2013.01); *H04N 21/25891* (2013.01)

(58) Field of Classification Search
None
See application file for complete search history.

(56) References Cited

U.S. PATENT DOCUMENTS

| | | | |
|---|---|---|---|
| 4,284,849 A | | 8/1981 | Anderson et al. |
| 5,441,047 A | * | 8/1995 | David ................. A61B 5/7475 600/483 |
| 7,038,121 B2 | | 5/2006 | Ishiwaka et al. |
| 7,113,090 B1 | * | 9/2006 | Saylor .............. G08B 13/19682 340/5.33 |
| 7,837,629 B2 | * | 11/2010 | Bardy ................. A61B 5/0002 600/508 |

(Continued)

FOREIGN PATENT DOCUMENTS

| | | |
|---|---|---|
| CN | 1679445 A | 12/2005 |
| JP | 10 257204 | 9/1998 |

(Continued)

*Primary Examiner* — Steven Lim
*Assistant Examiner* — Muhammad Adnan
(74) *Attorney, Agent, or Firm* — Haug PartnersLLP; William S. Frommer

(57) ABSTRACT

There is provided a content reproduction apparatus including a content reproduction unit for reproducing content, a habit detection unit for detecting a reproduction habit regarding content that uses the content reproduction unit, and an abnormality determination unit for determining there is an abnormality, in a case a reproduction action estimated from the reproduction habit detected by the habit detection unit is not carried out.

6 Claims, 8 Drawing Sheets

(56) References Cited

U.S. PATENT DOCUMENTS

| | | | |
|---|---|---|---|
| 7,843,323 B2 * | 11/2010 | Lim | A61B 5/6887 340/506 |
| 7,978,085 B1 * | 7/2011 | Kearns | A61B 5/1113 340/573.4 |
| 8,237,571 B2 * | 8/2012 | Wang | G10L 17/26 340/573.1 |
| 8,538,512 B1 | 9/2013 | Bibian | A61B 5/4839 600/544 |
| 8,605,082 B2 * | 12/2013 | Buchheit | G06T 3/00 345/419 |
| 8,635,282 B2 | 1/2014 | Berisford et al. | |
| 8,641,646 B2 * | 2/2014 | Colborn | A61B 5/1118 600/595 |
| 8,663,106 B2 | 3/2014 | Stivoric et al. | |
| 8,674,836 B2 * | 3/2014 | Ishimoto | G08B 21/0484 340/573.1 |
| 9,052,386 B2 * | 6/2015 | Yeredor | G06T 7/254 |
| 9,204,251 B1 * | 12/2015 | Mendelson | G07F 17/246 |
| 9,257,029 B1 * | 2/2016 | Hendrick, III | G16H 50/30 |
| 9,361,778 B1 * | 6/2016 | German | G08B 21/0423 |
| 9,504,406 B2 * | 11/2016 | Chetham | A61B 5/4872 |
| 9,875,450 B1 * | 1/2018 | Hendrick, III | G06Q 50/22 |
| 9,910,485 B2 * | 3/2018 | Mergen | G06F 1/3296 |
| 9,940,822 B2 * | 4/2018 | Sella | A61B 5/002 |
| 10,129,384 B2 * | 11/2018 | Wernevi | H04W 76/50 |
| 10,147,298 B2 * | 12/2018 | Ten Kate | A61B 5/1123 |
| 2002/0026867 A1 | 3/2002 | Hasegawa et al. | |
| 2002/0140571 A1 | 10/2002 | Hayes | |
| 2002/0171551 A1 * | 11/2002 | Eshelman | G08B 21/0423 340/573.1 |
| 2003/0084448 A1 | 5/2003 | Soundararajan | |
| 2003/0117279 A1 | 6/2003 | Ueno et al. | |
| 2005/0125403 A1 * | 6/2005 | Wakabayashi | G08B 21/0423 |
| 2005/0219055 A1 | 10/2005 | Takai et al. | |
| 2006/0015902 A1 | 1/2006 | Matsuura et al. | |
| 2006/0023949 A1 | 2/2006 | Saito et al. | |
| 2006/0261962 A1 * | 11/2006 | Berenguer | G08B 21/0423 340/573.1 |
| 2006/0269221 A1 | 11/2006 | Hashimoto et al. | |
| 2006/0271483 A1 | 11/2006 | Ernst et al. | |
| 2007/0079137 A1 * | 4/2007 | Tu | A63F 13/61 713/186 |
| 2007/0217621 A1 | 9/2007 | Takumai | |
| 2007/0236615 A1 * | 10/2007 | Tanaka | H04N 21/4756 348/734 |
| 2008/0001735 A1 * | 1/2008 | Tran | G06F 19/00 340/539.22 |
| 2008/0228039 A1 * | 9/2008 | Huseth | G08B 21/0423 600/300 |
| 2008/0256445 A1 * | 10/2008 | Olch | G16H 40/67 715/700 |
| 2008/0294462 A1 | 11/2008 | Nuhaan et al. | |
| 2009/0055006 A1 | 2/2009 | Asano | |
| 2009/0066501 A1 * | 3/2009 | Jung | G06Q 10/00 340/522 |
| 2009/0184821 A1 * | 7/2009 | Kuris | G08B 21/0461 340/541 |
| 2009/0216747 A1 * | 8/2009 | Li | G16H 50/80 |
| 2010/0070456 A1 * | 3/2010 | Sugihara | H04L 67/22 706/54 |
| 2010/0145164 A1 * | 6/2010 | Howell | A61B 5/0002 600/301 |
| 2011/0003665 A1 * | 1/2011 | Burton | G04G 9/007 482/9 |
| 2011/0271344 A1 | 11/2011 | Unagami et al. | |
| 2013/0141233 A1 * | 6/2013 | Jacobs | G16H 50/20 340/521 |
| 2013/0233933 A1 * | 9/2013 | Dostmann | F24F 11/30 236/44 A |
| 2015/0182130 A1 * | 7/2015 | Utter, II | A61B 5/681 600/483 |
| 2016/0051184 A1 * | 2/2016 | Wisbey | A61B 5/74 600/301 |
| 2016/0151603 A1 * | 6/2016 | Shouldice | H04R 3/00 600/28 |
| 2017/0332948 A1 * | 11/2017 | Weffers-Albu | G16H 50/30 |

FOREIGN PATENT DOCUMENTS

| | | | |
|---|---|---|---|
| JP | 11 47200 | 2/1999 | |
| JP | 2000 057462 | 2/2000 | |
| JP | 2000 99978 | 4/2000 | |
| WO | WO 2010108287 A1 * | 9/2010 | A61B 5/1117 |

* cited by examiner

FIG.5

EXAMPLE OF HABIT INFORMATION

| TIME | SUN | MON | TUE | WED | THU | FRI | SAT |
|---|---|---|---|---|---|---|---|
| 0:00 | 0.20 | 0.20 | 0.10 | 0.00 | 0.05 | 0.00 | 0.50 |
| 1:00 | 0.10 | 0.00 | 0.00 | 0.00 | 0.00 | 0.00 | 0.20 |
| 2:00 | 0.00 | 0.00 | 0.00 | 0.00 | 0.00 | 0.00 | 0.05 |
| 3:00 | 0.00 | 0.00 | 0.00 | 0.00 | 0.00 | 0.00 | 0.00 |
| 4:00 | 0.00 | 0.05 | 0.04 | 0.05 | 0.00 | 0.00 | 0.00 |
| 5:00 | 0.05 | 0.10 | 0.05 | 0.15 | 0.30 | 0.00 | 0.00 |
| 6:00 | 0.15 | 0.80 | 0.70 | 0.60 | 0.50 | 0.10 | 0.00 |
| 7:00 | 0.70 | 0.40 | 0.20 | 0.10 | 0.40 | 0.80 | 0.00 |
| 8:00 | 0.90 | 0.10 | 0.05 | 0.00 | 0.20 | 0.20 | 0.10 |
| 9:00 | 0.90 | 0.05 | 0.00 | 0.00 | 0.10 | 0.00 | 0.50 |
| 10:00 | 0.70 | 0.00 | 0.00 | 0.00 | 0.00 | 0.00 | 0.70 |
| 11:00 | 0.70 | 0.00 | 0.00 | 0.00 | 0.00 | 0.00 | 0.10 |
| 12:00 | 0.90 | 0.00 | 0.00 | 0.00 | 0.00 | 0.00 | 0.00 |
| 13:00 | 0.60 | 0.00 | 0.00 | 0.00 | 0.00 | 0.00 | 0.00 |
| 14:00 | 0.10 | 0.00 | 0.00 | 0.00 | 0.00 | 0.00 | 0.10 |
| 15:00 | 0.10 | 0.00 | 0.00 | 0.00 | 0.05 | 0.00 | 0.10 |
| 16:00 | 0.20 | 0.00 | 0.00 | 0.00 | 0.20 | 0.00 | 0.30 |
| 17:00 | 0.90 | 0.05 | 0.10 | 0.20 | 0.30 | 0.05 | 0.80 |
| 18:00 | 0.70 | 0.20 | 0.40 | 0.80 | 0.90 | 0.20 | 0.50 |
| 19:00 | 0.90 | 0.60 | 0.80 | 0.40 | 0.40 | 0.10 | 0.80 |
| 20:00 | 0.50 | 0.80 | 0.90 | 0.70 | 0.30 | 0.20 | 0.90 |
| 21:00 | 0.70 | 0.90 | 0.60 | 0.50 | 0.30 | 0.30 | 0.90 |
| 22:00 | 0.40 | 0.80 | 0.40 | 0.10 | 0.20 | 0.70 | 0.30 |
| 23:00 | 0.30 | 0.20 | 0.05 | 0.10 | 0.05 | 0.80 | 0.20 |

FIG.6

EXAMPLE OF METADATA

| ID | Ch | GENRE | CAST | BRIEF DESCRIPTION |
|---|---|---|---|---|
| 1001 | 011 | DRAMA | ACTRESS N | ......... |
| 1002 | 051 | NEWS | NEWSCASTER S | ......... |
| 1003 | 071 | BASEBALL | COMMENTATOR X | ......... |

FIG.7

EXAMPLE OF TASTE INFORMATION

| META-INFORMATION | TIME A | TIME B | TIME C | TIME D | TIME E | ...... |
|---|---|---|---|---|---|---|
| DRAMA | 0.70 | 0.00 | 0.05 | 0.00 | 0.50 | |
| NEWS | 0.30 | 0.10 | 0.70 | 0.20 | 0.50 | |
| BASEBALL | 0.10 | 0.90 | 0.10 | 0.80 | 0.00 | |
| ACTRESS N | 0.60 | 0.00 | 0.00 | 0.00 | 0.10 | |
| Ch 071 | 0.10 | 0.90 | 0.00 | 0.00 | 0.00 | |
| COMMENTATOR X | 0.10 | 0.60 | 0.00 | 0.00 | 0.00 | |

※ "TIME": SEASON (QUARTER, HALF-YEAR), MONTH, DAY OF WEEK, TIME SLOT, WEEKDAY / WEEKEND / HOLIDAY

CONTENT REPRODUCTION APPARATUS, MOBILE APPLIANCE, AND ABNORMALITY DETECTION METHOD

This is a continuation of application Ser. No. 13/023,741, filed Feb. 9, 2011, which is entitled to the priority filing date of Japanese application 2010-030368, filed on Feb. 15, 2010, the entirety of which is incorporated herein by reference.

BACKGROUND OF THE INVENTION

Field of the Invention

The present invention relates to a content reproduction apparatus, a mobile appliance, and an abnormality detection method.

Description of the Related Art

In recent years, a one-person household of an elderly person is on the increase. An elderly person living in a care home receives support for living from a caretaker or a nurse working at the care home. Accordingly, relatives of the elderly person living in the care home can easily check his/her safety via the caretaker or the nurse. In contrast, relatives or the like of an elderly person living alone have to, for example, personally visit the home or regularly make phone calls to check his/her safety.

However, if the elderly person is living far from the relatives or the like, it is not easy for the relatives or the like to personally visit his/her home. Also, if an attempt to contact by telephone or the like fails, it is difficult for the relatives or the like to decide whether the elderly person is simply out, or something has happened to him/her. From the standpoint of such situation, a mechanism is desired which enables to easily check the safety of a person living by himself/herself. A social mechanism where a person performs such checking is already implemented by private companies, a local government, and the like. However, implementation of such mechanism is costly, and, under the present circumstances, it is difficult to frequently send a person to visit all the one-person households.

Thus, a mechanism is devised which enables to check daily, by a machine, the safety of a person living alone. For example, JP-A-1998-257204 proposes a mechanism of checking daily the safety of a person living alone by using a plurality of presence sensors installed at home. Also, JP-A-2000-57462 proposes a mechanism of checking daily the safety of a person living alone by using a plurality of pressure sensors installed at home. Furthermore, JP-A-1999-47200 and JP-A-2002-99978 proposes mechanisms of checking daily the safety of a person living alone by monitoring operations such as turning on/off of a TV, selection of a channel, and the like, and detecting a difference from the daily operations.

SUMMARY OF THE INVENTION

However, the mechanisms proposed in JP-A-1998-257204 and JP-A-2000-57462 are premised on extensive installation of sensors at home. Therefore, huge costs will be incurred to introduce such mechanisms. Also, the presence sensor and the pressure sensor respond not only to human beings, but also to pets. Accordingly, there is an issue that false reports are constantly made from a one-person household where a pet is kept.

On the other hand, the mechanisms proposed in JP-A-1999-47200 and JP-A-2002-99978 are premised on registration of daily operations. Therefore, to use these mechanisms, it is necessary to sufficiently grasp a viewer's TV viewing habit and to register daily operations in advance. Also, if the viewing time changes from the normal time due to TV program reorganization, broadcasting of a special program, or the like, and an operation different from a normal operation is performed, the TV will determine the operation to be an abnormality.

In light of the foregoing, it is desirable to provide a content reproduction apparatus, a mobile appliance, and an abnormality detection method, which are new and improved, and which are capable of detecting an abnormality with higher accuracy.

According to an embodiment of the present invention, there is provided a content reproduction apparatus which includes a content reproduction unit for reproducing content, a habit detection unit for detecting a reproduction habit regarding content that uses the content reproduction unit, and an abnormality determination unit for determining there is an abnormality, in a case a reproduction action estimated from the reproduction habit detected by the habit detection unit is not carried out.

The content may be content delivered in real time. The content reproduction apparatus may further include a content comparison unit for comparing, in a case the reproduction action estimated from the reproduction habit detected by the habit detection unit is not carried out, first content currently being delivered and second content which was being delivered, at a time of detection of the reproduction habit, in a time slot same as that of the first content. The abnormality determination unit determines there is an abnormality, in a case a reproduction starting action estimated from the reproduction habit detected by the habit detection unit is not carried out and a result of comparison by the content comparison unit indicates that the first content and the second content are of a same type.

The content reproduction apparatus may further include a taste detection unit for detecting a taste of a user by analyzing a type of content reproduced by the user by using the content reproduction unit, and a taste determination unit for determining, in a case a content ending action estimated from the reproduction habit detected by the habit detection unit is not carried out and the result of comparison by the content comparison unit indicates that the first content and the second content are of different types, whether or not the first content matches the taste of the user detected by the taste detection unit. In this case, the abnormality determination unit determines there is an abnormality, in a case the reproduction ending action estimated from the reproduction habit detected by the habit detection unit is not carried out, the result of comparison by the content comparison unit indicates that the first content and the second content are of different types, and the taste determination unit determines that the first content does not match the taste of the user detected by the taste detection unit.

The content reproduction apparatus may further include a taste detection unit for detecting a taste of a user by analyzing a type of content reproduced by the user by using the content reproduction unit, and a taste determination unit for determining, in a case a reproduced content changing action estimated from the reproduction habit detected by the habit detection unit is not carried out and the result of comparison by the content comparison unit indicates that the first content and the second content are of different types, whether or not the first content matches the taste of the user detected by the taste detection unit. In this case, the abnormality determination unit determines there is an abnormality, in a case the reproduced content changing action estimated from the reproduction habit detected by the habit detection unit is not carried out, the result of comparison by the content comparison unit indicates that the first content and the second content are of different types, and the taste determination unit determines that the first content does not match the taste of the user detected by the taste detection unit.

The content reproduction apparatus may further include an abnormality notification unit for issuing, in a case the abnormality determination unit determines there is an abnormality, a notification of the abnormality to a specific external apparatus.

The content reproduction apparatus may further include an advance notification unit for outputting, before the abnormality notification unit issues the notification of the abnormality to the specific external apparatus, a sound or an image indicating to an effect that the notification of the abnormality will be issued, and a notification cancellation unit for performing control, according to a user operation, after the sound or the image is output by the advance notification unit, such that the notification of the abnormality is not issued to the specific external apparatus by the abnormality notification unit. In this case, the abnormality notification unit issues the notification of the abnormality to the specific external apparatus in a case a specific period of time has passed after the sound or the image was output by the advance notification unit without the notification cancellation unit performing control.

The content comparison unit may compare, based on an electronic program guide, the first content currently being delivered and the second content which was being delivered, at a time of detection of the reproduction habit, in a time slot same as that of the first content.

The content reproduction apparatus may further include a presence sensor capable of detecting a movement of a person present within a specific range that allows viewing of content reproduced by the content reproduction unit. In this case, the abnormality determination unit determines there is no abnormality, in a case a movement of the person present within the specific range is detected by the presence sensor.

The content reproduction apparatus may further include a human sensor for capturing an image of an object present within a specific range that allows viewing of content reproduced by the content reproduction unit, and detecting a part of a person in the image of the object captured, and a movement sensor for detecting a movement of the person detected by the human sensor, based on positions of a face continuously detected by the human sensor at specific time intervals. In this case, the abnormality determination unit determines there is no abnormality, in a case a movement of the person present within the specific range is detected by the movement sensor.

The content reproduction apparatus may further include a whereabouts acquisition unit for acquiring, from a location detection appliance for detecting a place a specific user is at, information on the place the specific user is at, and a whereabouts determination unit for determining whether the specific user is present within a specific range that allows viewing of content reproduced by the content reproduction unit, based on the information on the place the specific user is at acquired by the whereabouts acquisition unit. In this case, the abnormality determination unit determines there is no abnormality, in a case the specific user is determined by the whereabouts determination unit to be not present within the specific range.

The content reproduction apparatus may further include a power information acquisition unit for acquiring, from an electricity metre managing power consumption of a house, power information indicating the power consumption of the house, and a power comparison unit for comparing average power consumption observed in a case a person is in the house and the power consumption acquired by the power information acquisition unit. In this case, the abnormality determination unit determines there is no abnormality, in a case a result of comparison by the power comparison unit indicates a discrepancy between the average power consumption and the power consumption currently acquired by the power information acquisition unit.

The content reproduction apparatus may further include an other-apparatus information acquisition unit for acquiring other-apparatus information indicating reproduction state of content at another content reproduction apparatus. In this case, the abnormality determination unit determines there is no abnormality, in a case content is being reproduced by such another content reproduction apparatus, based on the other-apparatus information acquired by the other-apparatus information acquisition unit.

The content reproduction apparatus may further include an other-appliance content reproduction information acquisition unit for acquiring information relating to content reproduced by another content reproduction apparatus and information relating to time of reproduction of the content by such another content reproduction apparatus. In this case, the habit detection unit detects the reproduction habit regarding content that uses the content reproduction unit and a reproduction habit regarding content of such another content reproduction apparatus, the taste detection unit detects the taste of the user by analyzing a type of the content reproduced by the user by using the content reproduction unit and a type of the content reproduced by such another content reproduction apparatus.

According to another embodiment of the present invention, there is provided a mobile appliance which includes a position information acquisition unit for acquiring position information, a communication unit for exchanging information with an external appliance, a first habit detection unit for detecting a habitual behaviour pattern of a user based on a history of the position information acquired by the position information acquisition unit, a second habit detection unit for detecting a habit of exchanging the information using the communication unit, and an abnormality determination unit for determining there is an abnormality, in a case exchange of the information estimated based on the habit detected by the second habit detection unit is not carried out and there is no discrepancy between position information estimated based on the habitual behaviour pattern detected by the first habit detection unit and the position information currently acquired by the position information acquisition unit.

According to another embodiment of the present invention, there is provided an abnormality detection method which includes the steps of reproducing content, detecting a reproduction habit regarding content reproduced in the step of reproducing, and determining there is an abnormality, in a case a reproduction action estimated from the reproduction habit detected in the step of detecting is not carried out.

According to another embodiment of the present invention, there is provided an abnormality detection method performed by a mobile appliance including a position information acquisition unit for acquiring position information and a communication unit for exchanging information with an external appliance, which includes the steps of detecting a habitual behaviour pattern of a user based on a history of the position information acquired by the position information acquisition unit, detecting a habit of exchanging the information using the communication unit, and determining there is an abnormality, in a case exchange of the information estimated based on the habit detected in the step of detecting a habit is not carried out and there is no discrepancy between position information estimated based on the habitual behaviour pattern detected in the step of detecting a habitual behaviour pattern and the position information currently acquired by the position information acquisition unit.

According to another embodiment of the present invention, there is provided a program capable of realizing, by a computer, the function of each structural element of the content reproduction apparatus or the mobile appliance. Furthermore, according to another embodiment of the present invention, there is provided a recording medium in which the program is recorded, the recording medium being able to be read by a computer.

According to the embodiments of the present invention described above, it is possible to detect an abnormality with higher accuracy.

BRIEF DESCRIPTION OF THE DRAWINGS

FIG. 5 is an explanatory diagram showing a configuration of habit information calculated at the content reproduction apparatus according to the embodiment;

FIG. 6 is an explanatory diagram showing a configuration of metadata acquired at the content reproduction apparatus according to the embodiment;

FIG. 7 is an explanatory diagram showing a configuration of taste information calculated at the content reproduction apparatus according to the embodiment.

DETAILED DESCRIPTION OF THE EMBODIMENT

Figure 1:
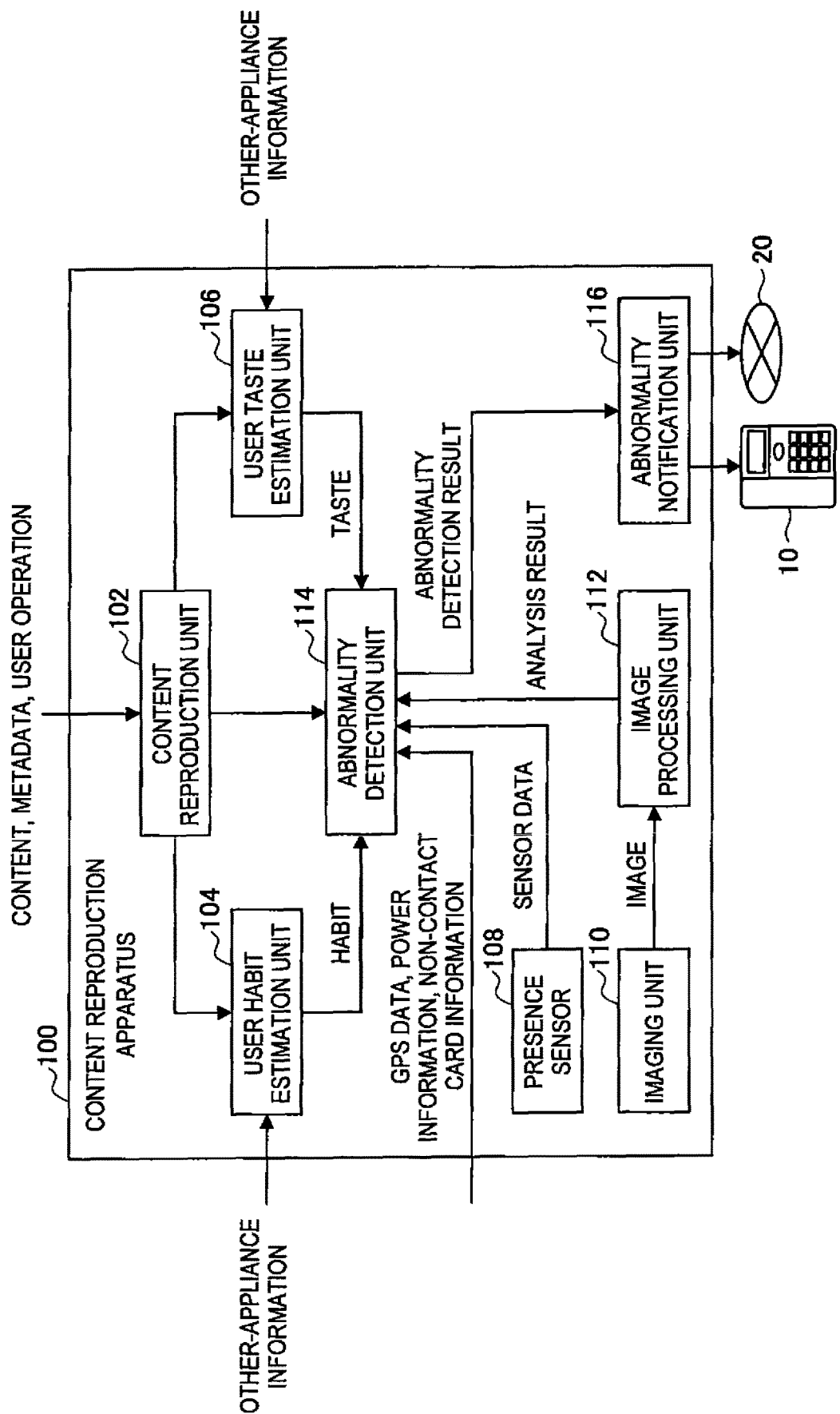
FIG. 1 is an explanatory diagram showing a functional configuration of a content reproduction apparatus according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

<Flow of Description>

A flow of description of an embodiment of the present invention which will be described below is briefly mentioned here. First, a functional configuration of a content reproduction apparatus 100 according to the embodiment will be described with reference to FIG. 1. Then, an operation of the content reproduction apparatus 100 according to the embodiment will be described with reference to FIGS. 2 to 4. At this point, configurations of habit information, metadata, and taste information used at the content reproduction apparatus 100 according to the embodiment will be described with reference to FIGS. 5 to 7.

Next, an example of a hardware configuration of the content reproduction apparatus 100 according to the embodiment will be described with reference to FIG. 8. Then, a method of applying the mechanism of the content reproduction apparatus 100 according to the embodiment to a mobile appliance will be described. Lastly, the technical ideas of the embodiment will be summarized and effects obtained by the technical ideas will be briefly described.

(Description Items)
1: Embodiment
  1-1: Functional Configuration of Content Reproduction Apparatus 100
  1-2: Operation of Content Reproduction Apparatus 100
  1-3: Example Hardware Configuration
  1-4: Application to Mobile Appliance
2: Summary <1: Embodiment>

In the following, an embodiment of the present invention will be described. The present embodiment relates to a user abnormality detection function implemented in an appliance for reproducing content (for example, a TV, a radio, a music player, a recording/reproducing apparatus, a mobile phone, a game machine, or the like). Particularly, it relates to an abnormality detection function for detecting an abnormality of a user by using metadata of content, a user's viewing habit, a user's taste, and the like. Additionally, in the following, an expanded method of improving the accuracy of abnormality detection by using an image captured by a camera or by sharing the habit information and taste of a user with another appliance will also be described.

<1-1: Functional Configuration of Content Reproduction Apparatus 100>

First, a functional configuration of the content reproduction apparatus 100 according to the present embodiment will be described with reference to FIG. 1. FIG. 1 is an explanatory diagram showing the functional configuration of the content reproduction apparatus 100 according to the present embodiment.

As shown in FIG. 1, the content reproduction apparatus 100 mainly includes a content reproduction unit 102, a user habit estimation unit 104, a user taste estimation unit 106, a presence sensor 108, an imaging unit 110, an image processing unit 112, an abnormality detection unit 114, and an abnormality notification unit 116.

(Content Reproduction Unit 102)

The content reproduction unit 102 has a function of reproducing content. Also, the content reproduction unit 102 has a function of acquiring metadata of content. Furthermore, the content reproduction unit 102 has a function of switching between on and off of power or between contents according to a user operation performed via a remote control or the like.

For example, the content reproduction unit 102 provides a reproduction function of a TV set, a recording/reproducing apparatus, a radio, a music player, or the like. Also, the type of content may be, for example, an image or sound delivered through a television broadcast network, sound delivered through a radio broadcast network, or an image or sound delivered through an information network such as the Internet, a cable television broadcast network, or the like. Also, the metadata may be, for example, a time slot for content delivery, a delivery channel, a genre, a cast, program contents, a title, an electronic program guide, or the like.

The content reproduction unit 102 inputs, to the user habit estimation unit 104, the user taste estimation unit 106 and the abnormality detection unit 114, information relating to content currently being reproduced, information relating to content reproduced in the past, or information relating to a user operation. The information relating to content includes, for example, metadata indicating a theme or type of content, a time slot for content delivery, and the like. Also, the information relating to a user operation includes, for example, information relating to an operation of switching between on and off of power, an operation of switching between contents, an operation of reproducing or cancelling content, and the like.

(User Habit Estimation Unit 104)

The information relating to a user operation is mainly input to the user habit estimation unit 104 from the content reproduction unit 102. When the information relating to a user operation is input, the user habit estimation unit 104 accumulates the information relating to a user operation, which has been input, as a user operation history. Then, the user habit estimation unit 104 estimates the user's reproduction habit based on the information relating to a user operation which has been accumulated as history. For example, the user habit estimation unit 104 estimates, for each day of the week (additionally, it may also be for each season, each month, or for each of a weekday, a weekend and a holiday. The same can be said for the following.), a timing of a user turning on or off the power or of switching between delivery channels.

Furthermore, the user habit estimation unit 104 may also estimate a time slot for which a recording reservation may be made by a user or the frequency of switching between delivery channels. Furthermore, the user habit estimation unit 104 may also estimate the order of switching of delivery channels for each time slot, or may estimate the order of operations unique to a user. For example, a user may habitually perform an operation of "switching to delivery channel Ch1 when a commercial is delivered during viewing of delivery channel Ch8," or an operation of "displaying an electronic program guide immediately after turning on the power." The user habit estimation unit 104 may also estimate such habitual operations.

Estimation by the user habit estimation unit 104 can be realized by extracting, based on an operation history, an operation performed with high frequency, or time slots where the same operation is performed, for example. The user habit estimation unit 104 holds, as habit information, the information on a user operation estimated in this manner (see FIG. 5). Furthermore, the user habit estimation unit 104 carries out estimation based on the information relating to a user operation that is newly input, and updates the habit information based on the estimation result.

This habit information is held, for example, in the form of a "probability of a specific user operation being performed," a "probability of being in a power-on state" or the like grouped for each time slot or each day of the week, as shown in FIG. 5. In the case the example of FIG. 5 shows the probability of being in a power-on state, it can be seen from this habit information that there is a tendency that content is viewed with high probability on Sundays from 7:00 am to 13:00 pm and from 17:00 pm to 21:00 pm. Also, in the case the example of FIG. 5 shows the probability of switching between contents, it can be seen from this habit information that there is a tendency that delivery contents are switched with high probability on Mondays from 6:00 am to 7:00 am and from 19:00 pm to 22:00 pm. Additionally, it is also possible to grasp a tendency to view content based on the tendency to switch between delivery channels.

The above example is habit information relating to a user's lifestyle habit. The user habit estimation unit 104 estimates, on one hand, such habit information relating to a lifestyle habit, and on the other hand, estimates for each day of the week or each time slot, based on the information relating to a user operation, content that is highly probable to be viewed by the user. For example, the user habit estimation unit 104 calculates a probability of "delivery channel Ch4 being viewed from 17:30 pm on Sundays" from the user operation history, and holds the calculation result as the habit information. Additionally, the probability of a user viewing a delivery channel can be easily obtained, for example, from aggregated results obtained by aggregating selection frequencies for respective delivery channels based on the user operation history.

(User Taste Estimation Unit 106)

The information relating to content is mainly input to the user taste estimation unit 106 from the content reproduction unit 102. When the information relating to content is input, the user taste estimation unit 106 accumulates the information relating to content, which has been input, as a content reproduction history. Then, the user taste estimation unit 106 estimates, for each day of the week or each time slot, the taste of a user, based on the accumulated content reproduction history. Also, the user taste estimation unit 106 holds the estimated taste of the user as taste information (see FIG. 7). Furthermore, the user taste estimation unit 106 estimates the taste of the user by using the information relating to content that is newly input, and updates the taste information based on the estimation result.

Additionally, as a concrete method of estimating the taste of the user, the method disclosed in JP-A-2004-192461, JP-A-2009-266096, JP-A-2001-160955, or the like (hereinafter, a taste estimation algorithm) can be used. When using these methods, a genre, a cast, program contents, a title, or the like, that a user likes can be estimated based on the content reproduction history. Thus, the user taste estimation unit 106 applies the taste estimation algorithm mentioned above to the reproduction history of content reproduced on each day of the week and in each time slot, and estimates the taste of the user for each day of the week and for each time slot. For example, in the case the metadata shown in FIG. 6 can be used, the user taste estimation unit 106 can estimate, for each day of the week and for each time slot, a delivery channel, a genre, a cast, or the like, that the user likes.

For example, as shown in FIG. 7, the user taste estimation unit 106 calculates, for each day of the week and for each time slot, a degree of taste in accordance with the type of metadata. This degree of taste is an index indicating a degree of user's liking. This degree of taste is calculated to be higher as the frequency of a delivery channel, a genre, a cast, or the like, to be viewed by the user is higher. In the example of FIG. 7, content whose "genre is drama" and "cast is actress N" is viewed with high frequency at time A. Similarly, in the example of FIG. 7, delivery channel Ch071 is viewed with high frequency at time B. As such, the user taste estimation unit 106 calculates the degree of taste for each day of the week and for each time slot based on the history of metadata input as the information relating to reproduced content.

(Presence Sensor 108)

The presence sensor 108 is a sensor for detecting whether or not there is a person near the content reproduction apparatus 100. For example, the presence sensor 108 detects presence of a person by using infrared light, an ultrasonic wave, visible light, or a combination thereof. Also, the sensing area of the presence sensor 108 is set to a range that allows a user to view content, for example. A detection result of the presence sensor 108 is input to the abnormality detection unit 114 as sensor data. Additionally, the movement of a person can be detected by installing a plurality of presence sensors 108. Therefore, a plurality of presence sensors 108 may be installed for the content reproduction apparatus 100.

Additionally, the presence sensor 108 may be means for detecting presence of a user by acquiring information relating to usage state of an electricity metre and comparing the usage state at ordinary times and the current usage state. If it is detected that a user is not present, then there is no abnormality. Thus, this means can be used to prevent a false report caused due to a user's going out or the like.

(Imaging Unit 110, Image Processing Unit 112)

The imaging unit 110 includes an optical system for collecting light reflected by a subject, an image sensor (for example, a CMOS, a CCD, or the like) for photoelectrically converting, for each pixel, light collected by the optical system, an analog-digital converter for converting an electrical signal output from the image sensor to digital image data, and the like. The digital image data output from the imaging unit 110 is input to the image processing unit 112. Additionally, the imaging area of the imaging unit 110 is set to a range that allows a user to view content.

When the digital image data is input, the image processing unit 112 analyses the digital image data, and performs person detection or face detection for a user who is registered in advance. Furthermore, the image processing unit 112 analyses the result of person detection or face detection and a plurality of pieces of the digital image data that are sequentially input, and detects a movement of a person. Then, the image processing unit 112 determines, based on these analysis results, whether a user is present near the content reproduction apparatus 100 and whether the user is moving. The determination result by the image processing unit 112 is input to the abnormality detection unit 114 as an analysis result.

(Abnormality Detection Unit 114)

Information relating to a current user operation and information relating to content are input to the abnormality detection unit 114 from the content reproduction unit 102. Also, the habit information estimated by the user habit estimation unit 104 and the taste information estimated by the user taste estimation unit 106 are input to the abnormality detection unit 114. Furthermore, the sensor data showing the detection result of the presence sensor 108 and the analysis result of the image processing unit 112 are input to the abnormality detection unit 114. The abnormality detection unit 114 determines whether there is an abnormality in the viewing behaviour of a user by using these pieces of information.

(Determination 1)

For example, the abnormality detection unit 114 compares a first user operation indicated by information relating to the current user operation and a second user operation expected, based on the habit information, at the same day of the week and the same time slot as the current time point, and if they do not match, determines that there is an abnormality in the viewing behaviour of the user (hereinafter, determination 1). However, the abnormality detection unit 114 does not settle the determination result at this stage.

Additionally, a user operation that is of highest probability at a corresponding day of the week and a corresponding time slot is selected, in the habit information, as the second user operation which is taken as the subject of comparison, for example. Or, a user operation for which probability is a specific value or more at a corresponding day of the week and a corresponding time slot is selected, in the habit information, as the second user operation which is taken as the subject of comparison. In this case, when a plurality of second user operations are selected, if any of the second user operations matches the first user operation, it is determined that there is no abnormality in the viewing behaviour of the user.

(Determination 2)

In the case the viewing behaviour of the user is determined to be abnormal in determination 1, the abnormality detection unit 114 compares the information relating to content being reproduced and a taste of the user expected, based on the taste information, at the same day of the week and the same time slot as the current time point, and if they do not match, determines that there is an abnormality in the viewing behaviour of the user (hereinafter, determination 2). In the case the viewing behaviour of the user is determined to be abnormal in determination 2, the abnormality detection unit 114 settles the determination result, and inputs to the abnormality notification unit 116 an abnormality detection result for reporting an abnormality of the user. However, the abnormality detection unit 114 may perform determinations 3 and 4 described later without settling the determination result at this stage.

(Determination 3)

In the case the viewing behaviour of the user is determined to be abnormal in determinations 1 and 2, the abnormality detection unit 114 refers to the sensor data. In the case the movement of the user is confirmed when referring to the sensor data, the abnormality detection unit 114 determines that there is no abnormality in the viewing behaviour of the user (hereinafter, determination 3). On the other hand, in the case the viewing behaviour of the user is determined to be abnormal in determination 3, the abnormality detection unit 114 settles the determination result, and inputs to the abnormality notification unit 116 the abnormality detection result for reporting an abnormality of the user. However, the abnormality detection unit 114 may perform determination 4 described later without settling the determination result at this stage.

(Determination 4)

In the case the viewing behaviour of the user is determined to be abnormal in determinations 1, 2 and 3, the abnormality detection unit 114 refers to the analysis result of the image processing unit 112. In the case the movement of the user is confirmed when referring to the analysis result, the abnormality detection unit 114 determines that there is no abnormality in the viewing behaviour of the user (hereinafter, determination 4). On the other hand, in the case the viewing behaviour is determined to be abnormal in determination 4, the abnormality detection unit 114 settles the determination result, and inputs to the abnormality notification unit 116 the abnormality detection result for reporting an abnormality of the user.

(Abnormality Notification Unit 116)

As described above, when an abnormality is observed in the viewing behaviour of the user, the abnormality detection result for reporting an abnormality of the user is input to the abnormality notification unit 116. When this abnormality detection result is input, the abnormality notification unit 116 transmits the abnormality detection result to an external apparatus (an external person) to notify of the abnormality of the user via a telephone line 10, an Internet connection 20, or the like, for example. For example, the abnormality notification unit 116 transmits the abnormality detection result for reporting the abnormality of the user to the telephone, computer, or the like, of the relatives or nurse of the user.

Additionally, before transmitting the abnormality detection result to the external apparatus, the abnormality notification unit 116 notifies the user, over a specific period of time, to the effect that the abnormality detection result will be transmitted. For example, the abnormality notification unit 116 issues a sound or an alarm indicating that the abnormality detection result will be transmitted, or displays on a content reproduction screen to the effect that the abnormality detection result will be transmitted. Furthermore, it is assumed that the party to be notified by the abnormality notification unit 116 is registered in advance. Also, as a notification method of the abnormality notification unit 116, various contact methods set in advance, such as contact by telephone, delivery of emails, or the like, are used.

In the foregoing, the functional configuration of the content reproduction apparatus 100 according to the present embodiment has been described.

<1-2: Operation of Content Reproduction Apparatus 100>

Figure 2:
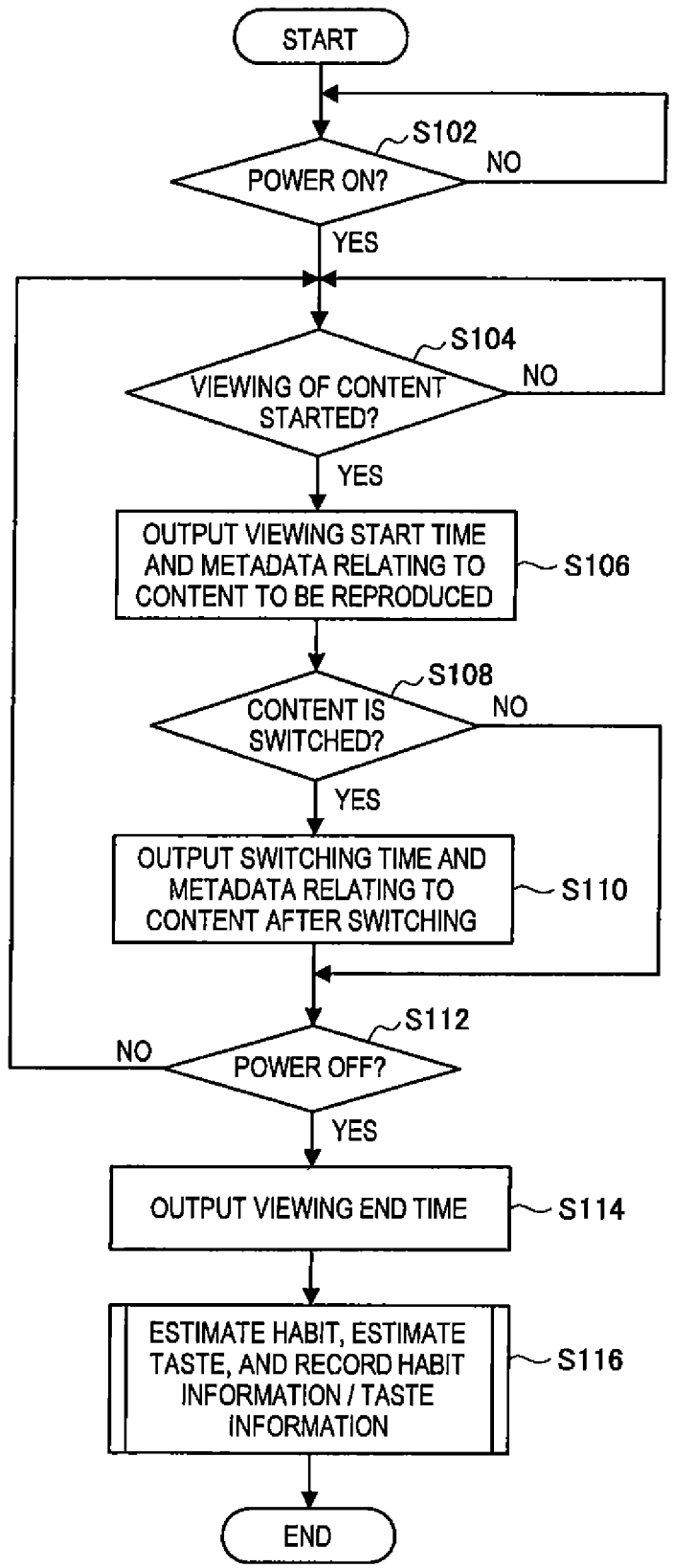
FIG. 2 is an explanatory diagram showing an operation of the content reproduction apparatus according to the embodiment.
Figure 3:
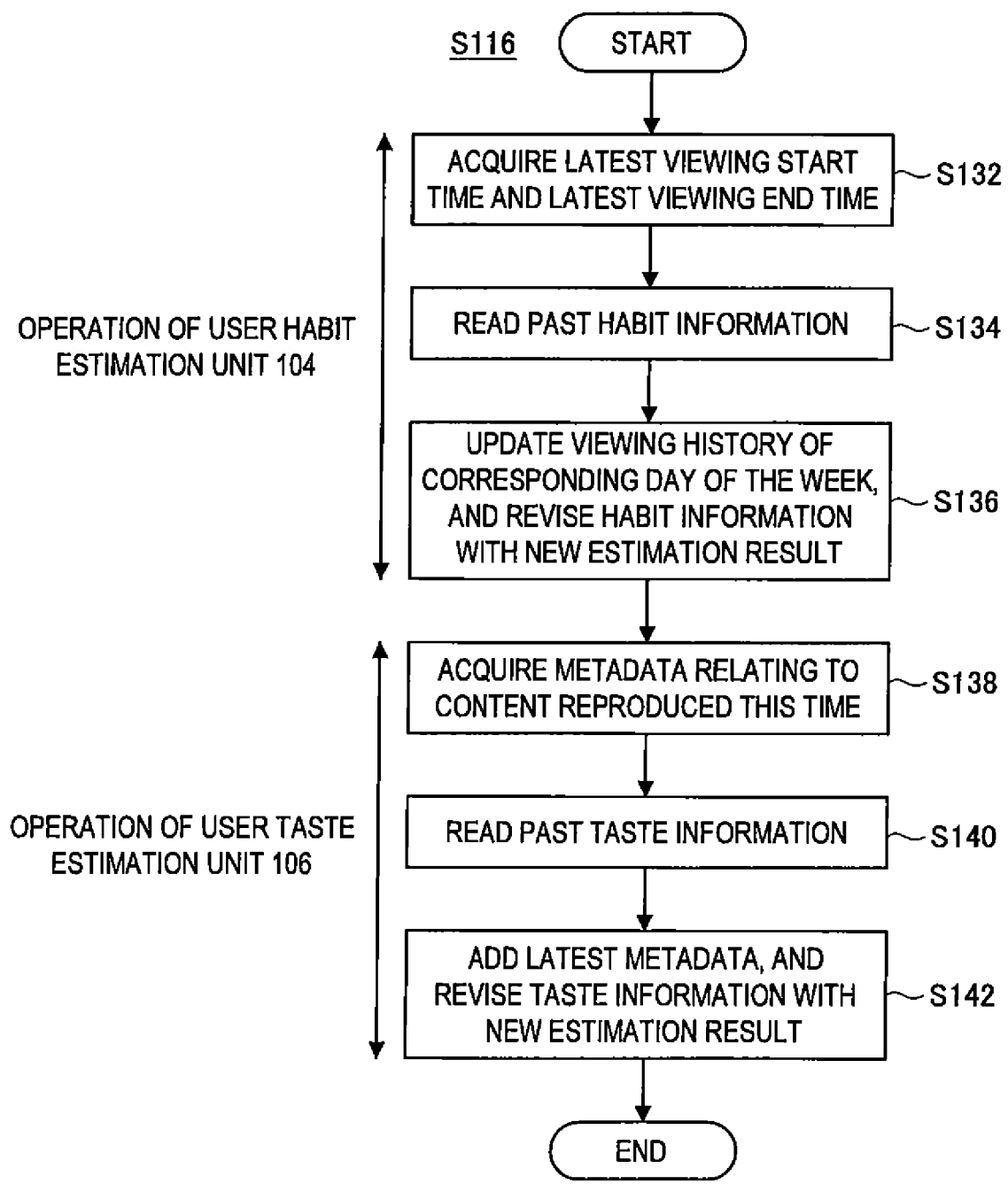
FIG. 3 is an explanatory diagram showing an operation of the content reproduction apparatus according to the embodiment.
Figure 4:
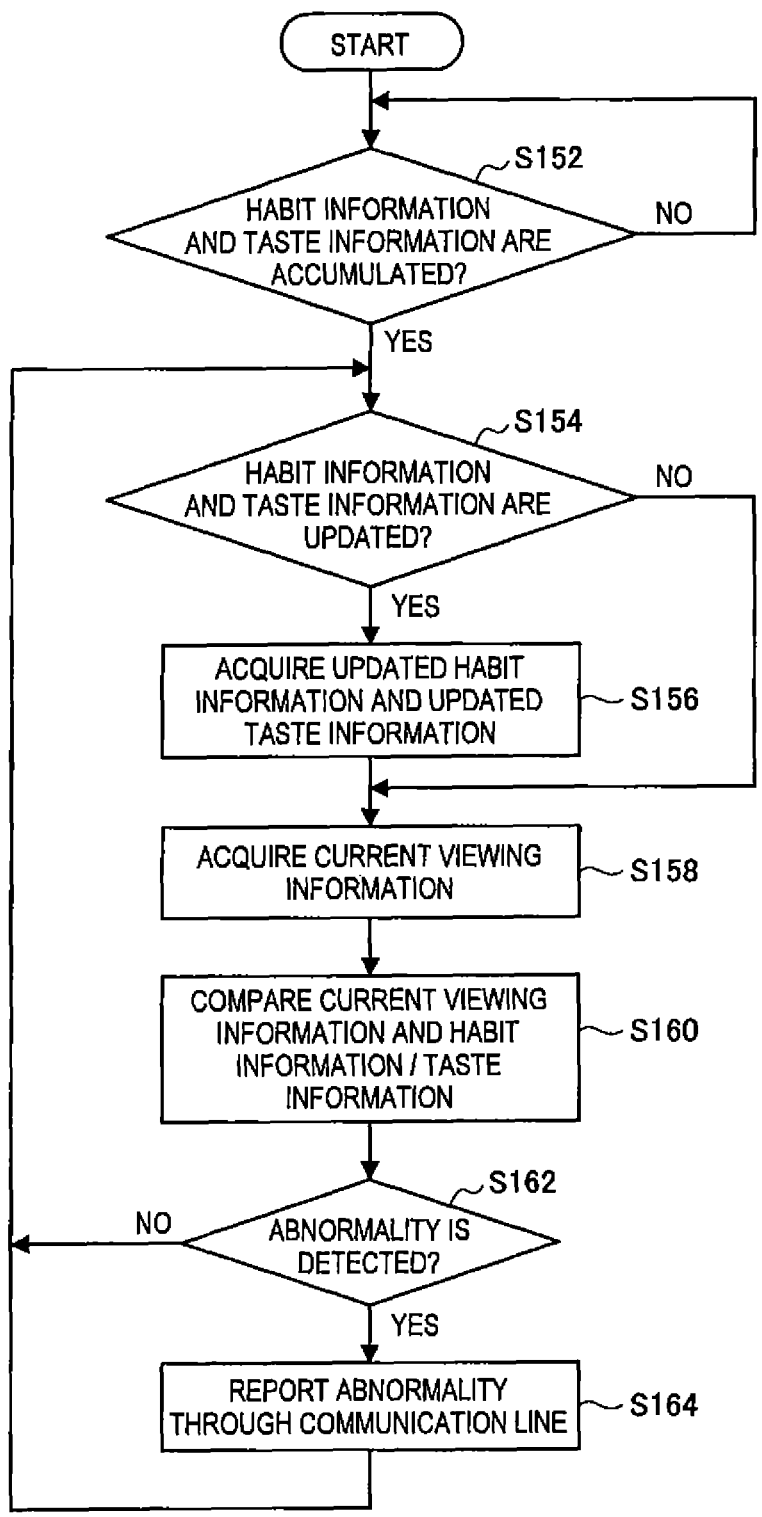
FIG. 4 is an explanatory diagram showing an operation of the content reproduction apparatus according to the embodiment.

Next, an operation of the content reproduction apparatus 100 according to the present embodiment will be described with reference to FIGS. 2 to 4. FIGS. 2 to 4 are explanatory diagrams showing operation flows of the content reproduction apparatus 100 according to the present embodiment.

(Overall Operation Flow)

As shown in FIG. 2, first, the content reproduction apparatus 100 determines whether a user operation of turning on the power is performed, by using the function of the content reproduction unit 102 (S102). In the case the user operation of turning on the power is performed, the content reproduction apparatus 100 proceeds with the process to step S104. On the other hand, in the case the user operation of turning on the power is not performed, the content reproduction apparatus 100 returns the process to step S102.

The content reproduction apparatus 100 which has proceeded with the process to step S104 determines whether a user operation of starting to, view (reproduce) content is performed, by using the function of the content reproduction unit 102 (S104). In the case the user operation of starting to view content is performed, the content reproduction apparatus 100 proceeds with the process to step S106. On the other hand, in the case the user operation of starting to view content is not performed, the content reproduction apparatus 100 returns the process to step S104.

The content reproduction apparatus 100 which has proceeded with the process to step S106 acquires a viewing start time and metadata relating to content to be reproduced, and outputs the same to the user habit estimation unit 104, the user taste estimation unit 106, and the abnormality detection unit 114, by using the function of the content reproduction unit 102 (S106).

Next, the content reproduction apparatus 100 determines whether a user operation of switching content is performed, by using the function of the content reproduction unit 102 (S108). In the case the user operation of switching content is performed, the content reproduction apparatus 100 proceeds with the process to step S110. On the other hand, in the case the user operation of switching content is not performed, the content reproduction apparatus 100 proceeds with the process to step S112.

The content reproduction apparatus 100 which has proceeded with the process to step S110 acquires a content switching time and metadata relating to content after switching, and outputs the same to the user habit estimation unit 104, the user taste estimation unit 106, and the abnormality detection unit 114, by using the function of the content reproduction unit 102 (S110). Then, the content reproduction apparatus 100 proceeds with the process to step S112.

The content reproduction apparatus 100 which has proceeded with the process to step S112 determines whether a user operation of turning off the power is performed, by using the function of the content reproduction unit 102 (S112). In the case the user operation of turning off the power is performed, the content reproduction apparatus 100 proceeds with the process to step S114. On the other hand, in the case the user operation of turning off the power is not performed, the content reproduction apparatus 100 returns the process to step S104.

The content reproduction apparatus 100 which has proceeded with the process to step S114 outputs, to the user habit estimation unit 104 and the user taste estimation unit 106, the time the user operation of turning off the power is performed as a viewing end time, by using the function of the content reproduction unit 102 (S114). Then, the content reproduction apparatus 100 performs estimation of habit and estimation of taste and records the estimation results as the habit information and the taste information (S116), by the functions of the user habit estimation unit 104 and the user taste estimation unit 106, and ends the series of processes.

By performing the processes of steps S102 to S116, the habit information and the taste information used for abnormality detection are obtained. Additionally, although an example where the estimation of habit and the estimation of taste are performed after the user operation of turning off the power has been performed is shown here, a configuration is also possible where the estimation of habit and the estimation of taste are performed at the time of switching content (S110).

(Operation Flow Relating to Estimation Process)

Next, an operation flow of the content reproduction apparatus 100 relating to the estimation of habit and the estimation of taste will be described in greater detail with reference to FIG. 3. Additionally, the operation flow which will be described here mainly relates to the functions of the user habit estimation unit 104 and the user taste estimation unit 106.

As shown in FIG. 3, first, the user habit estimation unit 104 acquires, from the content reproduction unit 102, the latest viewing start time and the latest viewing end time (S132). Then, the user habit estimation unit 104 reads past habit information (see FIG. 5) that is already held (S134). Next, the user habit estimation unit 104 updates the viewing history of a same day of the week as the current time point, and revises the habit information with a habit estimation result (for example, a viewing probability, or the like) based on the new viewing history (S136).

Next, the user taste estimation unit 106 acquires, from the content reproduction unit 102, metadata (see FIG. 6) relating to the content that is reproduced this time (S138). Then, the user taste estimation unit 106 reads the past taste information (see FIG. 7) that is already held (S140). Then, the user taste estimation unit 106 updates the metadata of a same day of the week as the current time point, and revises the taste information with a taste estimation result based on the new metadata (S142).

By performing the processes of steps S132 to S142, the habit information and the taste information are updated based on the habit and the taste of the user estimated based on the new viewing information.

(Operation Flow Relating to Abnormality Detection)

Next, an operation flow of the content reproduction apparatus 100 relating to abnormality detection will be described in greater detail with reference to FIG. 4. Additionally, the operation flow which will be described here mainly relates to the function of the abnormality detection unit 114. Moreover, the operation flow of FIG. 4 is independent of the operation flow of FIG. 2, and thus is performed in parallel with the operation flow of FIG. 2.

First, the abnormality detection unit 114 determines whether the habit information and the taste information have been sufficiently accumulated (S152). For example, the abnormality detection unit 114 determines whether the total viewing time of content has exceeded a specific threshold.

To obtain a reliable abnormality detection result, the habit information and the taste information that include sufficient amount of information become necessary. Thus, in the case the habit information and the taste information are not sufficiently accumulated, the abnormality detection unit 114 returns the process to step S152. On the other hand, if the habit information and the taste information are sufficiently accumulated, the abnormality detection unit 114 proceeds with the process to step S154. Additionally, the time until the habit information and the taste information are sufficiently accumulated can be shortened by having the viewing time slot of content, a preferred genre, and the like, registered as initial values of the habit information and the taste information and using these initial values.

The abnormality detection unit 114 which has proceeded with the process to step S154 determines whether the habit information and the taste information are updated (S154). In the case the habit information and the taste information are updated, the abnormality detection unit 114 proceeds with the process to step S156. On the other hand, in the case the habit information and the taste information are not updated, the abnormality detection unit 114 proceeds with the process to step S158.

The abnormality detection unit 114 which has proceeded with the process to step S156 acquires the updated habit information and the updated taste information respectively from the user habit estimation unit 104 and the user taste estimation unit 106 (S156). Then, the abnormality detection unit 114 proceeds with the process to step S158.

The abnormality detection unit 114 which has proceeded with the process to step S158 acquires, from the content reproduction unit 102, viewing information (the information relating to user operation, the information relating to content) at the current time point (S158). Then, the abnormality detection unit 114 compares the current viewing information with the habit information and the taste information (or a user operation, metadata, or the like, expected in the future) (S160). At this point, the abnormality detection unit 114 performs determinations 1 to 4 described above or a part thereof.

In the case it is determined to be abnormal (an abnormality is detected), the abnormality detection unit 114 proceeds with the process to step S164. On the other hand, in the case it is not determined to be abnormal (an abnormality is not detected), the abnormality detection unit 114 returns the process to step S154. The abnormality detection unit 114 which has proceeded with the process to step S164 notifies the abnormality notification unit 116 of an abnormality detection result, and reports the abnormality through a communication line (S164). When the process of step S164 is over, the abnormality detection unit 114 returns the process to step S154.

The processes of steps S152 to S164 enable to detect an abnormality of a user with higher accuracy. Additionally, the loop of processing steps performed from steps S154 to S164 is repeatedly performed as long as power is supplied to the content reproduction apparatus 100.

In the foregoing, the operation flows of the content reproduction apparatus 100 have been described.

<1-3: Example Hardware Configuration>

Figure 8:
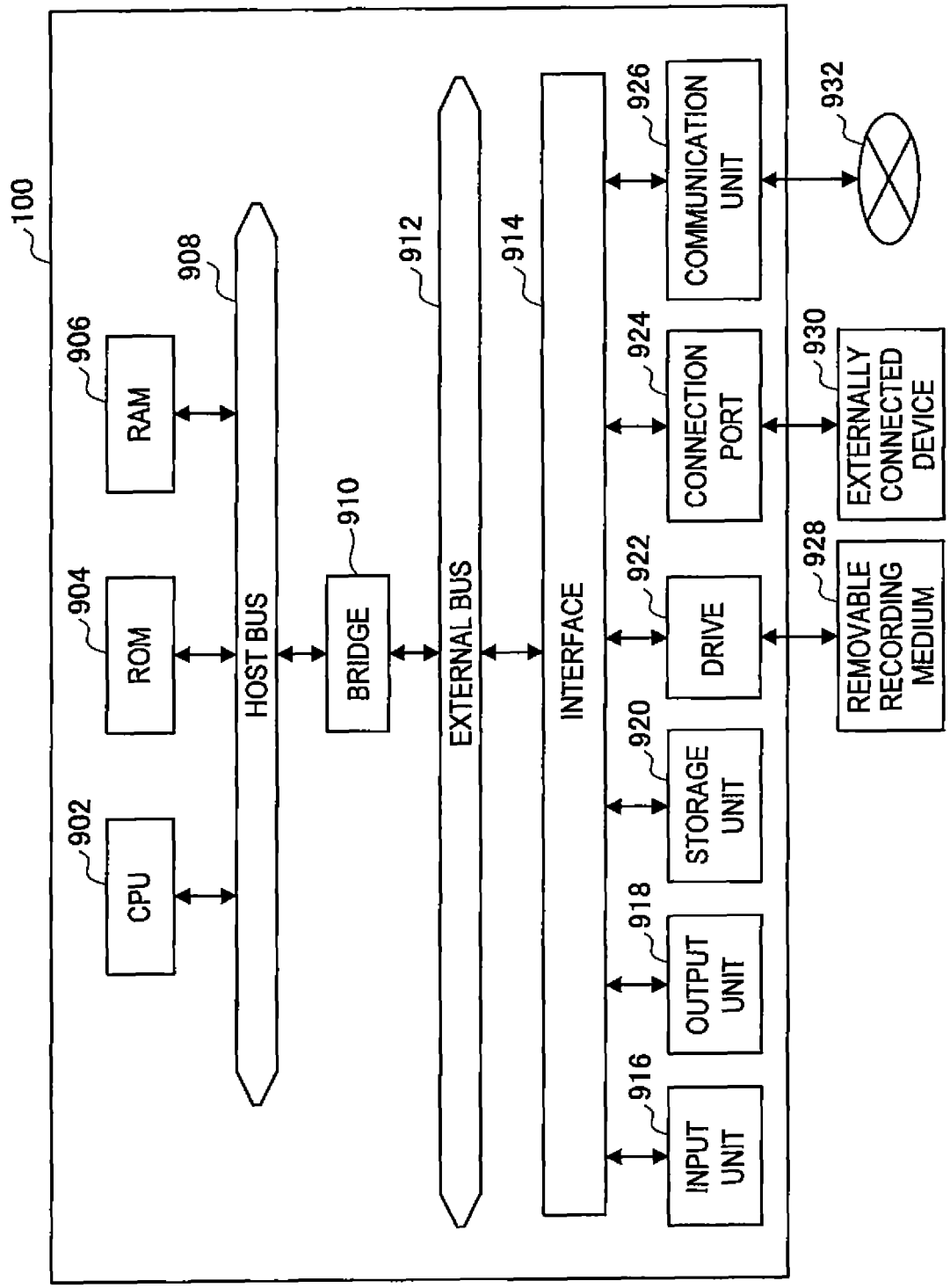
FIG. 8 is an explanatory diagram showing a hardware configuration of the content reproduction apparatus according to the embodiment.

The function of each structural element of the content reproduction apparatus 100 described above can be realized by using, for example, the hardware configuration of an information processing apparatus illustrated in FIG. 8. That is, the function of each structural element can be realized by controlling the hardware shown in FIG. 8 using a computer program. Additionally, the mode of this hardware is arbitrary, and may be a personal computer, a mobile information terminal such as a mobile phone, a PHS or a PDA, a game machine, or various types of information appliances. Moreover, the PHS is an abbreviation for Personal Handy-phone System. Also, the PDA is an abbreviation for Personal Digital Assistant.

As shown in FIG. 8, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls entire operation or a part of the operation of each structural element based on various programs recorded on the ROM 904, the RAM 906, the storage unit 920, or a removal recording medium 928. The ROM 904 is means for storing, for example, a program to be loaded on the CPU 902 or data or the like used in an arithmetic operation. The RAM 906 temporarily or perpetually stores, for example, a program to be loaded on the CPU 902 or various parameters or the like arbitrarily changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote control that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removal recording medium 928 such as a magnetic disk, an optical disk, a magneto-optical disk, or a semiconductor memory, or writes information in the removal recording medium 928. The removal recording medium 928 is, for example, a DVD medium, a Blu-ray medium, an HD-DVD medium, various types of semiconductor storage media, or the like. Of course, the removal recording medium 928 may be, for example, an electronic device or an IC card on which a non-contact IC chip is mounted. The IC is an abbreviation for Integrated Circuit.

The connection port 924 is a port such as an USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or various communication modems. The network 932 connected to the communication unit 926 is configured from a wire-connected or wirelessly connected network, and is the Internet, a home-use LAN, infrared communication, visible light communication, broadcasting, or satellite communication, for example. Moreover, the LAN is an abbreviation for Local Area Network. Also, the WUSB is an abbreviation for Wireless USB. Furthermore, the ADSL is an abbreviation for Asymmetric Digital Subscriber Line.

<1-4: Application to Mobile Appliance>

The technology described above can be applied, as it is, to various mobile appliances represented by mobile phones, portable game machines, and the like. Furthermore, this technology can be extended by using the functions installed in the mobile appliances. In the following, as application to a mobile appliance, a method of detecting an abnormality using a function unique to the mobile appliance will be described.

Many mobile appliances are equipped with the function of acquiring information on a current location (hereinafter, position information). For example, a mobile appliance may be equipped with a function of acquiring the position information by a Global Positioning System (GPS), a function of acquiring the position information based on the position information of a wireless base station that is accessible from the current location, or the like. Also, the mobile appliance may be equipped with a function of a non-contact card. Information having monetary values such as electronic money, a coupon, or the like (hereinafter, value information), information relating to value information use history (hereinafter, use history), or the like, is stored in the non-contact card.

It is conceivable that an abnormality of a user can be detected with higher accuracy by using such position information or use history. For example, in the case the position information can be used, the location of the user for each day of the week and for each time slot (hereinafter, a behaviour pattern) can be grasped by accumulating the position information and performing habit estimation.

Also, in the case the use history can be used, the purchase pattern of a user for each day of the week and for each time slot (for example, "user buys pastries at the same store in the weekday mornings") can be grasped by accumulating the use history and performing habit estimation. Furthermore, the taste regarding purchasing of a user can be grasped by accumulating the use history and performing taste estimation.

Here, a case will be considered where an attempt is made to detect an abnormality of a user by estimating a communication habit or a calling habit of the user by using a communication history or a call history in a mobile appliance, and comparing the estimation result and a communication behaviour or a calling behaviour actually taken. That is, a case will be considered where the user operation related to the content reproduction apparatus 100 described above is replaced with an email transmission operation or a communication operation.

In this case, there is a possibility that an abnormality of a user is detected from the discrepancy between the estimation result and the communication behaviour or the calling behaviour actually taken. However, if emails or calls are too frequent or are rarely used, it is difficult to detect an abnormality with high accuracy.

Furthermore, a case will be considered where an attempt is made to detect an abnormality of a user by estimating a habit of the user based on the history of content reproduction performed by using a TV function or a music player function equipped in a mobile appliance, and comparing the estimation result and an operation which is actually performed.

In this case, applying a configuration substantially the same as that of the content reproduction apparatus 100 described above enables to detect an abnormality of a user with a certain level of accuracy. However, the timing of reproducing content on a mobile appliance depends greatly on the behaviour of the user, such as the user moving from one place to another or the user waiting for someone, and the accuracy is degraded compared to the accuracy of abnormality detection by the content reproduction apparatus 100 installed at home.

For these reasons, the inventor of the present invention has devised a method of using in combination, when applying the technology of the content reproduction apparatus 100 described above to the mobile appliance, abnormality detection based on the content reproduction history, the communication history or the call history and abnormality detection based on the behaviour pattern or taste regarding purchasing. By applying this method, an abnormality of a user can be detected with high accuracy even in the case of applying the technology of the content reproduction apparatus 100 described above to the mobile appliance.

<2: Summary>

Lastly, technical contents according to the embodiment of the present invention will be summarized. The technical contents stated here can be applied to various information processing apparatuses, such as a personal computer, a mobile phone, a portable game machine, a mobile information terminal, an information appliance, a car navigation system, and the like.

The information processing apparatus described above can be expressed as follows. The information processing apparatus includes a content reproduction unit, a habit detection unit, a content comparison unit, and an abnormality determination unit as follows. The content reproduction unit is for reproducing content delivered in real time.

Also, the habit detection unit mentioned above is for detecting a reproduction habit regarding content that uses the content reproduction unit. For example, in the case the content is a broadcast program, timings and specific user operations such as the start of viewing of the broadcast program, the end of viewing, switching of delivery channels, and the like, are detected as the reproduction habit.

Also, the content comparison unit mentioned above is for comparing, in a case a reproduction action estimated from the reproduction habit detected by the habit detection unit is not carried out, first content currently being delivered and second content which was being delivered, at a time of detection of the reproduction habit, in a time slot same as that of the first content.

For example, in the case the content is a broadcast program, a program which is normally broadcast may not be broadcast due to, for example, program reorganization, and a user may perform an operation different from the operation normally performed or may not perform an operation normally performed. However, if the content comparison unit mentioned above is used, a broadcast program currently being delivered is referred to, and thus special circumstances such as program reorganization will be taken into consideration.

Furthermore, the abnormality determination unit is for determining there is an abnormality, in a case a reproduction starting action estimated from the reproduction habit detected by the habit detection unit is not carried out and a result of comparison by the content comparison unit indicates that the first content and the second content are of a same type.

In the case special circumstances such as program reorganization has taken place as described above, a false detection may occur if abnormality detection is performed based only on the reproduction habit of a user. However, since special circumstances such as program reorganization are taken into consideration by the content comparison unit, false detection will not be made by the abnormality determination unit based on the special circumstances such as program reorganization.

As a reason for false detection, a case where a user views a program that he/she does not usually view (for example, a feature program or the like) can be considered, in addition to program reorganization. In such a case, turning on/off of power or switching of channels may be not performed at an estimated time. It is difficult to anticipate such a situation no matter how the operation history of a user is analysed.

Accordingly, in the case the power is not turned on even though a time has arrived at which an operation of turning on the power is anticipated based on the estimation result of a user's habit, processes of checking whether content that is usually viewed is being broadcast and, in the case it is being broadcast, of detecting an abnormality become necessary. The information processing apparatus mentioned above corresponding to the content reproduction apparatus 100 is to realize such processes.

Furthermore, to further improve the accuracy of abnormality detection, it is desirable to perform processes, in the case the power is not turned off even though a time has arrived at which an operation of turning off the power is anticipated based on the estimation result of a user's habit, of checking the content of a channel being viewed at the time and, in the case it does not match an estimated taste, of detecting an abnormality.

Furthermore, it is desirable to perform processes, in the case a switching operation is not performed even though a time has arrived at which an operation of switching contents is anticipated, of checking the content of a channel being viewed at the time and, in the case it does not match an estimated taste, of detecting an abnormality.

Additionally, false reports can be reduced by informing a user, by a buzzing sound or voice, before notifying a registered person of an abnormality after detection of the abnormality, to the effect that a notification will be issued, and issuing the notification only when there is no response. As described, by including a user's taste in the conditions for detecting an abnormality, false reports can be reduced.

For example, a false report is not made even if power of the TV is not turned on due to a program which is normally viewed not being broadcast because of program reorganization or a special program. Also, a false report is not made even if a program suiting the taste of a user is broadcast, due to program reorganization or a special program, in the same channel sequentially to a program which is normally viewed or even if the user simply did not switch the channel.

By using the technology described above, detection of an abnormality based on a content viewing activity of everyday life can be performed with high accuracy for a one-person household. Also, using the technology described above makes introduction of a large-scale system unnecessary, and thus burden of cost can be suppressed. Furthermore, it can be used by an elderly person having difficulty performing a complicated setting operation, because a user does not have to perform setting or registration himself/herself.

(Notes)

The user habit estimation unit 104 described above is an example of a habit detection unit. The abnormality detection unit 114 described above is an example of a content comparison unit, an abnormality determination unit, a taste determination unit, a whereabouts acquisition unit, a whereabouts determination unit, or a power comparison unit. The user taste estimation unit 106 is an example of a taste detection unit. The abnormality notification unit 116 described above is an example of an advance notification unit, or a notification cancellation unit. The imaging unit 110 and the image processing unit 112 described above are examples of a human sensor, or a movement sensor.

It should be understood by those skilled in the art that various modifications, combinations, sub-combinations and alterations may occur depending on design requirements and other factors insofar as they are within the scope of the appended claims or the equivalents thereof.

An abnormality detection method using a single appliance has been described above, but it is also possible to improve the accuracy of abnormality detection by using a plurality of content reproduction apparatuses 100.

For example, the accuracy of estimation of a habit or a taste can be improved by connecting a plurality of content reproduction apparatuses 100 via a network, sharing among them a user operation history, a metadata history, estimated habit information, estimated taste information, or the like, and using such information. Furthermore, a mechanism can be realized according to which notification of an abnormality is prevented in the case an operation of a radio is performed in a time slot for TV viewing.

Additionally, application to a mobile appliance has been described above, but a method can also be conceived of using a mobile appliance having a position information acquisition function as a user location detection appliance.

According to this method, position information is transmitted from the mobile appliance to the content reproduction apparatus 100, and the location of a user is decided by the content reproduction apparatus 100 (the abnormality detection unit 114) based on the position information which has been transmitted.

Then, if the user is at a place far away from the content reproduction apparatus 100, the content reproduction apparatus 100 does not determine an abnormality using the function of the abnormality detection unit 114. According to such configuration, abnormality detection can be performed with higher accuracy.

Furthermore, in the description above, the expression "metadata" is used with an electronic program guide or the like in mind, but the metadata is not limited to the electronic program guide.

For example, in the case the content reproduced by the content reproduction apparatus 100 is a movie, it is conceivable to use, as the metadata, information relating to DVD release of the movie or review information. Furthermore, a situation is also conceivable where information described on a Web page that is gathering reputations on a TV program is used as the metadata.

The present application contains subject matter related to that disclosed in Japanese Priority Patent Application JP 2010-030368 filed in the Japan Patent Office on Feb. 15, 2010, the entire content of which is hereby incorporated by reference.

What is claimed is:

1. An information processing apparatus, comprising:
circuitry configured to
receive location information of different locations at which a first user is present at respective times,
receive history information of the first user, the history information representing past activities performed by the first user at the different locations at the respective times,
store an activity pattern of the first user based on the history information according to the location information, the activity pattern representing the activities, including types of activities performed by the first user at respective locations at the respective times represented by the received location information,
accumulate, from the history information, activity information representing the user's past activities that were performed by the first user at particular locations at particular time slots,
determine, from the accumulated activity information, probability values for respective types of activities included in the activity pattern that were performed by the first user at the respective locations at the respective time slots in particular days, each probability value representing whether and how often that type of activity was performed by the first user at that particular location and at that particular time slot,
store habit information of the first user based on the probability of a particular type of activity being performed, the habit information representing how often the first user performs the same type of activity at the respective locations at the respective time slots in the particular days and reflecting an expectation that a particular activity will be performed,
detect an abnormality in the first user's current activity pattern when the probability value determined for a respective activity is greater than a predetermined threshold based on the stored habit information and the type of activity currently performed by the first user is the same type of activity, but differs from an expected activity included in the stored activity pattern, and
provide an abnormality indication based on the detected abnormality in the current activity pattern of the first user to a terminal of a second user.

2. The information processing apparatus of claim 1, wherein the activity pattern is a behavior pattern of the user.

3. The information processing apparatus of claim 1, wherein the activity pattern is a purchase pattern of the user.

4. The information processing apparatus of claim 1, wherein the abnormality indication indicates a change in the first user's activity pattern that exceeds a predetermined threshold.

5. A method of providing predetermined information to a terminal, comprising:
obtaining location information of different locations at which a first user is present at respective times,
obtaining history information of the first user, the history information representing past activities performed by the first user at the different locations at the respective times,
storing an activity pattern of the first user based on the history information according to the location information, the activity pattern representing the activities, including types of activities performed by the first user at respective locations at the respective times represented by the received location information,
accumulating, from the history information, activity information representing the past activities performed by the first user at particular locations at particular time slots,
determining from the accumulated activity information probability values for respective types of activities included in the activity pattern that were performed by the first user at the respective locations at the respective time slots in particular days, each probability value representing whether and how often that typed of activity was performed by the first user at that particular location and at that particular time slot,
storing habit information of the first user based on the probability of a particular type of activity being performed, the habit information representing how often the first user performs the same type of activity at the respective locations at the respective time slots in the particular days and reflecting an expectation that a particular activity will be performed,
detecting an abnormality in the first user's current activity pattern when the probability value determined for a respective activity is greater than a predetermined threshold based on the stored habit information and the type of activity currently performed by the first user is the same type of activity, but differs from an expected activity included in the stored activity pattern, and
providing an abnormality indication based on the detected abnormality to a terminal of a second user.

6. A non-transitory computer readable storage medium on which is recorded instructions that, when read by a processor, cause the processor to:
receive location information of different locations at which a first user is present at respective times,
receive history information of the first user, the history information representing past activities performed by the first user at the different locations at the respective times,
store an activity pattern of the first user based on the history information according to the location information, the activity pattern representing the activities, including types of activities performed by the first user at respective locations at the respective times represented by the received location information, accumulate, from the history information, activity information representing the user's past activities that were performed by the first user at particular locations at particular time slots, determine from the accumulated activity information probability values for respective types of activities included in the activity pattern that were performed by the first user at the respective locations at the respective time slots in particular days, each probability value representing whether and how often that type of activity was performed by the first user at that particular location and at that particular time slot, store habit information of the first user based on the probability of a particular type of activity being performed, the habit information representing how often the first user performs the same type of activity at the respective locations at the respective time slots in the particular days and reflecting an expectation that a particular activity will be performed, detect an abnormality in the first user's current activity pattern when the probability value determined for a respective activity is greater than a predetermined threshold based on the stored habit information and the type of activity currently performed by the first user is the same type of activity, but differs from an expected activity included in the stored activity pattern, and provide an abnormality indication based on the detected abnormality to a terminal of a second user.

* * * * *